United States Patent [19]
Gilbert

[11] 3,878,600
[45] Apr. 22, 1975

[54] METHOD OF MAKING PRECISELY POSITIONED COMPOSITE STRUCTURE UTILIZING NON-PRECISE FIBERGLASSING TECHNIQUES

[75] Inventor: Gordon H. Gilbert, Jefferson Parish, La.

[73] Assignee: Gretna Fiberglass Fabricators, Inc., Gretna, La.

[22] Filed: Apr. 2, 1973

[21] Appl. No.: 347,044

[52] U.S. Cl. .................... 29/460; 29/464; 156/305; 220/DIG. 23; 220/55 C
[51] Int. Cl. .......................... B23p 3/00; B23p 19/04
[58] Field of Search ...... 29/460, 464 X; 156/305 X; 220/55 R, 55 C X, DIG. 23 X, 20, 20.5

[56] References Cited
UNITED STATES PATENTS

| | | | |
|---|---|---|---|
| 2,948,047 | 8/1960 | Peeler et al. | 29/460 X |
| 3,115,281 | 12/1963 | Somme | 220/55 C X |
| 3,458,275 | 7/1969 | Bense et al. | 220/55 R X |
| 3,707,033 | 12/1972 | Knott | 29/460 |
| 3,811,173 | 5/1974 | Baumann | 29/460 |

*Primary Examiner*—Charlie T. Moon
*Attorney, Agent, or Firm*—Pugh & Laiche

[57] ABSTRACT

A water tight protective casing which includes an outer fiberglass box with an inner metal frame in which four electronic logging panels, for example, can be placed, two to either side of the main central division in the frame, for transportation particularly in a marine environment. The casing also includes a fiberglass top having a generally pyramidal shape in order to evenly distribute the sealing stresses and pressures from the central top point along the gasketed, sealing interface between the top and the bottom of the casing. The inner frame comprises six, peripherally spaced, vertical channel iron members, the inner one being doubled, fastened to a lower and upper box-like auxillary frame. The inner frame itself contains the four electronic panel boxes which are situated within and between the chanel iron members which define the panel chambers. Centrally located within the frame is a vertical support terminating in a threaded male member or stud to which is attached the top of the casing by means of a special locking nut.

The frame must be precisely positioned and located within the exterior casing in order to properly mate with the top, close tolerances being absolutely necessary to insure the waterproof capabilities of the casing. Part of the method of producing the casing includes providing side adjustment members on the frame, initially moveable with respect to the main body of the frame, which are positioned against the inner sides of the outer, molded fiberglass box, which was formed with a chopper gun, after the frame is initially positioned within it. The frame is then removed, the adjustment members welded in place and the fixed frame returned to the outer box and attached thereto and embedded therein by manually adding in fiberglass mats or layers over the facing side and bottom members of the frame, saturating them with resin and allowing them to harden.

6 Claims, 10 Drawing Figures

3,878,600

METHOD OF MAKING PRECISELY POSITIONED COMPOSITE STRUCTURE UTILIZING NON-PRECISE FIBERGLASSING TECHNIQUES

BACKGROUND OF THE INVENTION

The present invention relates to a protective, watertight casing, particularly suitable for transportion electronic gear in an off-shore or marine environment, and the method of making the casing. The casing includes an outer fiberglass box, an inner metal frame and a fiberglass top. The method of manufacture is particularly directed to the attaching and mating and precise positioning of the metal frame with the outer box.

Heretofore, particularly in the transportation of heavy electronic gear such as logging gear to an off-shore location, great losses of many tens of thousands of dollars were incurred whenever the gear might be knocked over into the water or doused or sprayed with salt water in the less than water-tight transportation casings presently available in the prior art before the present invention.

The present invention overcomes all of the prior art problems with a relatively simple, straight forward but highly reliable structure. The casing of the present invention is not only water tight but even floats. Indeed, in one instance, when some expensive logging gear being transported in the casing of the present invention to an off-shore location was lost over the side into the water, the casing floating in the water was retrieved without the slightest water damage to the equipment.

In manufacturing the casing of the present invention, it is critical that the frame be precisely positioned with respect to the lip of the box in order to insure the proper positioning of the top with respect to the box for a watertight seal. In order to achieve this and yet use chopper gun fiberglassing techniques which produce non-uniform wall thicknesses, the method of manufacture of the present invention was developed in order to be able to provide the casing of the present invention at a reasonable price and yet have a casing which was watertight and highly reliable.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 8 is a side view of the special locking nut used in the present invention; while

DESCRIPTION OF THE PREFERRED EMBODIMENT

Basic Structure

Figure 1:
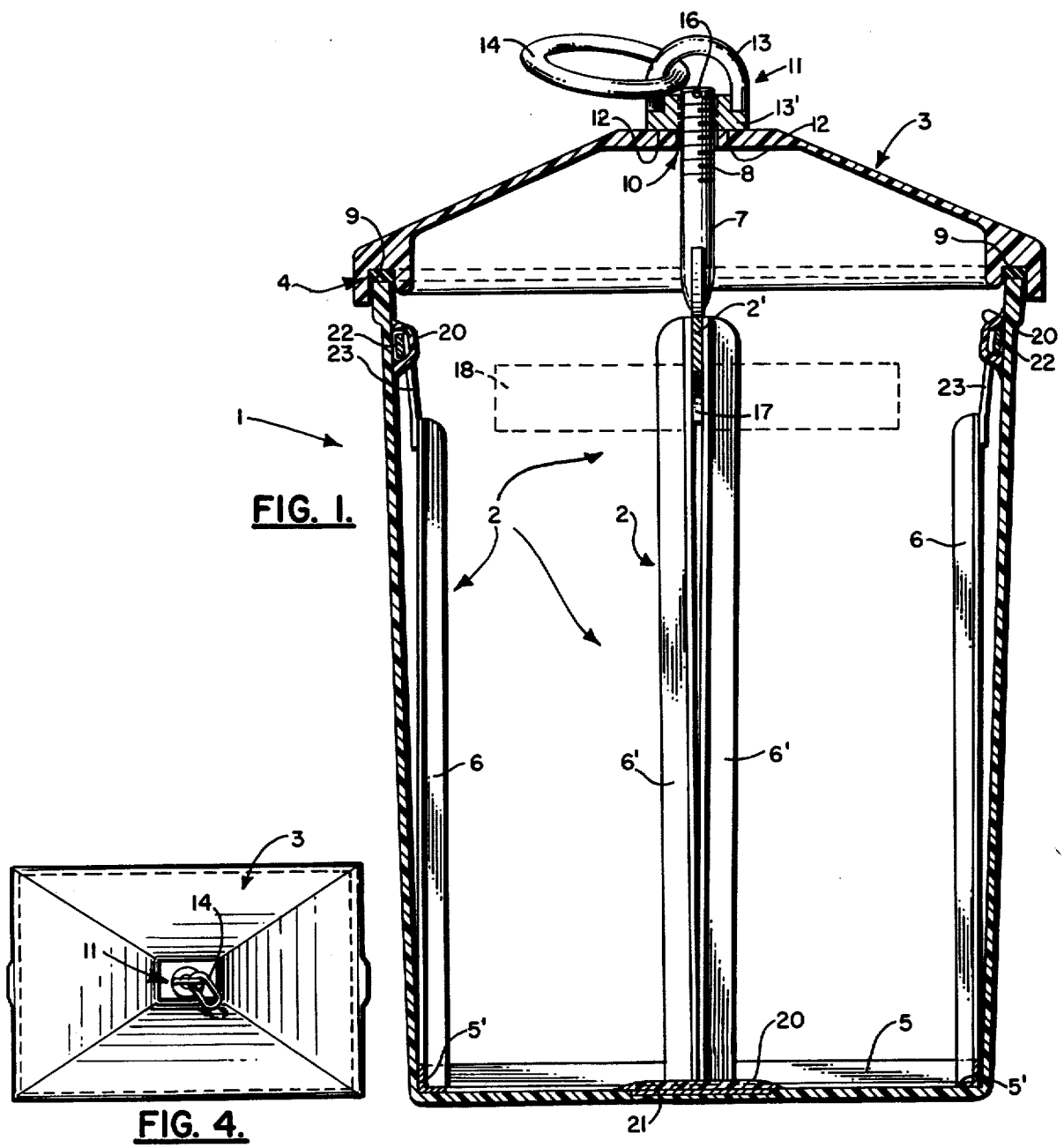
FIG. 1 is an end, cross-sectional view through the center of the protective casing of the present invention showing its interior structure.
Figure 4:
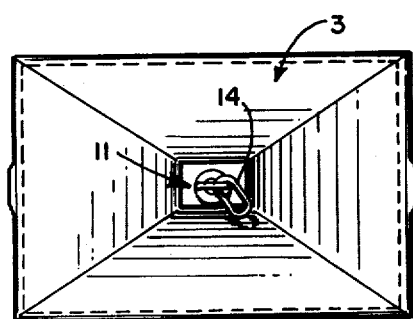
FIGS. 2, 3 and 4 are side, end and top, exterior views, respectively, of the protective casing of the present invention.
Figure 2:
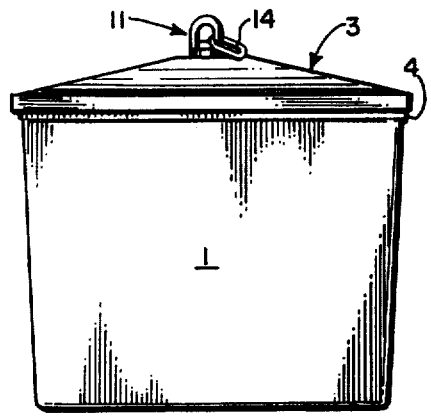
Figure 3:
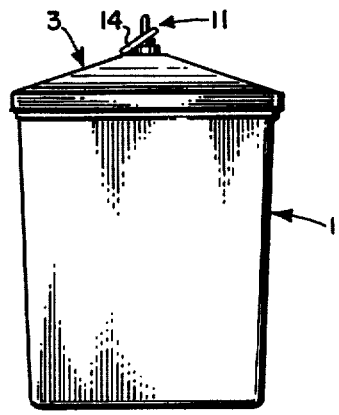
Figure 5:
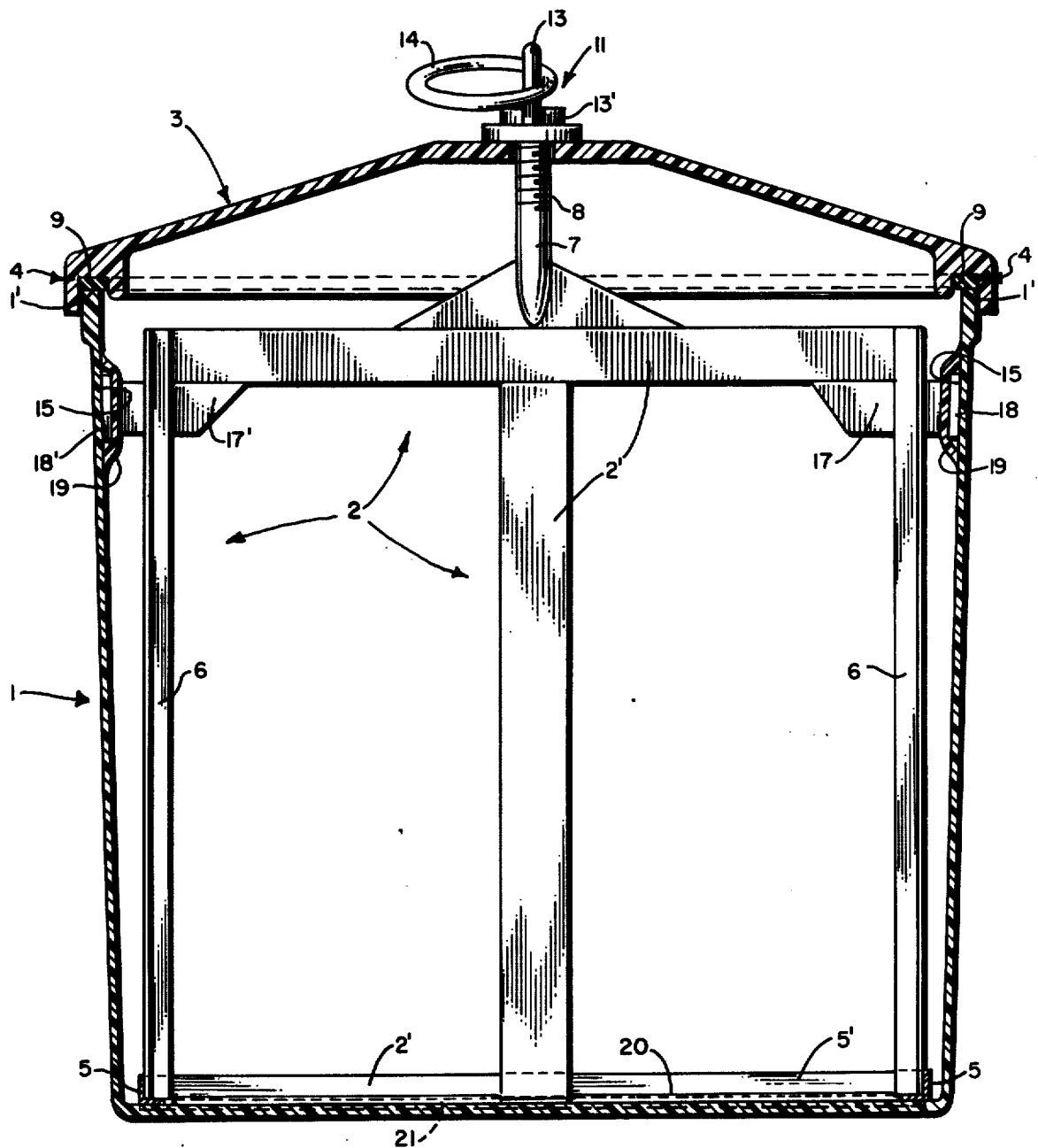
FIG. 5 is a side, cross-sectional view through the center of the protective casing of the present invention showing its interior structure.

As shown in FIGS. 1-5, the preferred embodiment of the protective casing of the present invention comprises an outer, fiberglass box 1, an inner steel frame 2 and a top 3.

The protective casing includes an outer, fiberglass box 1 with an inner metal frame 2 into which four electronic logging panels for example can be placed, two to either side of the main central division 2' in the frame 2, for transportation or storage particularly in a marine environment. The fiberglass top 3 has a generally pyramidal shape, but rectangular in horizontal cross-section, in order to evenly distribute the sealing stresses and pressures from the central top point along the gasketed, sealing interface 4 between the top and the bottom of the casing.

The inner frame 2 comprises six, peripherally spaced, vertical channel iron members, the inner ones 6' being doubled, fastened to a lower rectangular auxillary frame 5, 5', respectively, of channel iron. The frame 2 itself contains the four electronic panel boxes (not illustrated) which are situated within and between the channel iron members 6, 6' and 5, 5' which define the panel chambers.

It is noted that the channel-iron elements 6, 6' and 5, 5' of the frame 2 are the surfaces which actually mate with the electronic panels and are substantially removed from the surface of the fiberglass. Thus the panels only come into contact with the sturdy channel-iron members 6 and not the sides of the fiberglass enclosure itself. It is further noted that should the frame 2 ever break away from the exterior fiberglass box 1, the panels will continuously be held by the frame 2 so that in such eventuality the panels would not be lost.

Centrally located within the frame 2 is a vertical support 7 terminating in a threaded male member 8 to which is attached the top 3 of a casing. The threaded member 8 comprises a male stud.

The frame 2 must be precisely positioned and located within the exterior box 1 in order to properly mate with the top 3, close tolerances being absolutely necessary to insure the waterproof capabilities of the casing.

The interface 4 of the top 3 with the bottom box 1 includes a continuous, peripheral channel in which a closed foam gasket 9 is positioned in order to provide a water-tight seal between the bottom 1 and the top 3 portions of the casing when the two are locked together.

In order to close off the casing after the electronic panels have been inserted within the frame 2 inside the lower portion 1 of the casing, the top 3 having central aperture 10 therein is placed over the bottom 1 so that the male stud 8 protrudes through the central aperture 10. A locking nut 11, having a finely machined, smooth bottom surface 12 is then placed on top of the male stud 8 and screwed tight. The polished, machined lower surface 12 of the nut 11 provides a sealing surface preventing any water from seeping into the casing through the central aperture 10 in the top. To further insure a proper seal between the nut 11, top 3 and male stud 8, an appropriate sealing grease, for example any readily available waterproof grease standard in the industry, is placed on and over their mating surfaces. The sealing grease also serves to prevent any galling between the bottom of the nut 11 and the fiberglass upper surface of the top 3.

Figure 8:
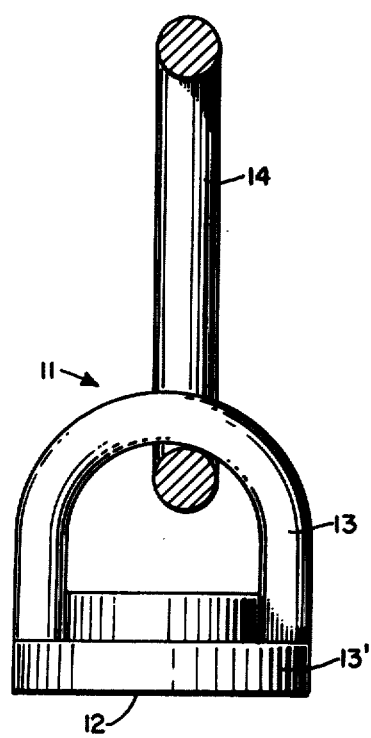
Figure 9:
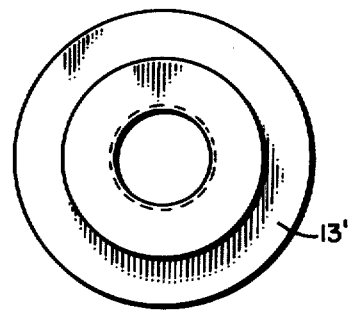
FIGS. 9 and 10 are top and side-cross-sectional views of the lower, circular portion of the locking nut of FIG. 8.
Figure 10:
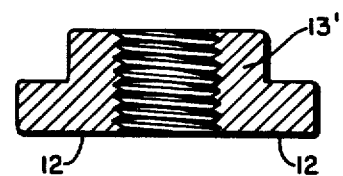

The nut 11, as shown particularly in FIGS. 1 and 8, includes at its top portion an inverted-U element 13, welded to a bottom, circular element 13', into which is placed a closed generally rectangular member 14 similar to a chain link. This latter link element 14 serves as a gripping surface to allow leverage in screwing the nut 11 down on the male stud 8. The link 14 also serves as a hoisting member for attachment to a crane when the relatively heavy casing with gear therein is transferred from, for example, a boat to an offshore oil rig.

When the nut 11 is screwed onto the male stud 8 in its final position, an elongated, cotter or locking pin (not illustrated) is inserted through a hole 16 provided in the top of the male stud 8, locking the nut 11 onto the male stud 8, preventing any further rotational movement between the two. It is further noted that the dimensions of the inverted-U 13 and the thickness of the chain link structure 14 are chosen so that the link structure 14 will prevent the nut 11 from being screwed down onto the male stud 8 passed a predetermined distance, preventing the crushing of the fiberglass top 3 which might have been caused by an over tightening of the nut 11 on the stud 8.

Method of Manufacture

The method of producing the casing is as follows.

The first step in the process is to form by standard fiberglassing techniques the basic exterior fiberglass box 1 using a gel coated, smooth surfaced, female plug into and on which the fiberglass material is sprayed by means of a standard chopper gun.

Figure 6:
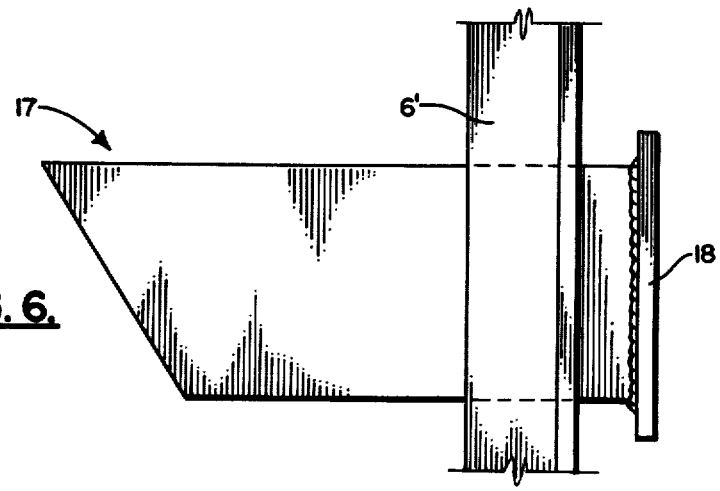
FIGS. 6 and 7 are side and top cross-sectional views of one of the side adjustable brackets of the frame used in the present invention.
Figure 7:
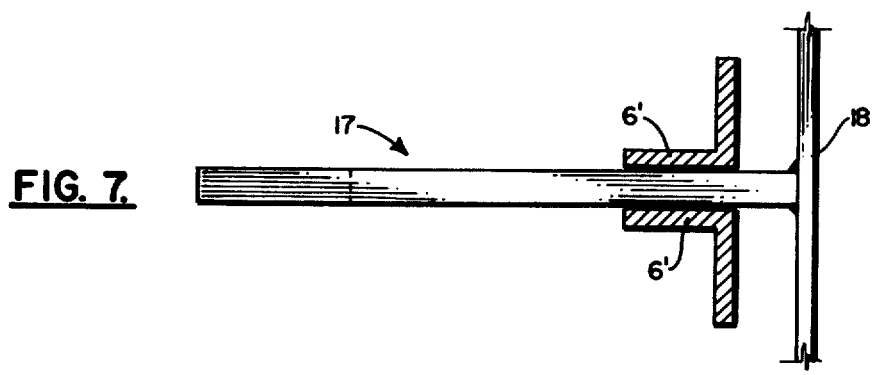

The initial basic frame 2 includes along its vertical, central main division 2' in its longer dimension two adjustable side members or brackets 17, 17' (note FIGS. 5-7) which are adjustable as to their position in a longitudinal direction. The adjustable members or brackets 17, 17' are used in order to embed the sides of the frame into the protective casing and yet allow precise positioning of the centrally located frame 2 within the lower box 1 of the casing. It should be noted that each box 1, due to it having been produced by a chopper gun technique, varies and has a different wall thickness. Since the frame 2 and its male stud 8 have to be exactly centered so that top 3 properly mates with the box 1, each frame 2 is individually fitted by means of the adjustable side members 17, 17' to its respective box 1.

After forming the basic, exterior lower body 1 of the fiberglass protective casing, the metal frame 2 is generally positioned within the basic fiberglass box 1. The male stud 8 and the frame 2 itself is precisely positioned with respect to the upper lip 1' of the box 1 by means of a positioning jig (not illustrated) which insures the precise, central location of the male stud 8 so as to precisely mate with the female opening 10 in the top 3 of the casing.

After the frame 2 is precisely positioned with the assistance of the positioning jig, the side members 17, 17' are fully extended outwardly in a longitudinal direction until the facing members 18, 18' mate with the sides 15 of the basic box 1 of the protective casing. The frame 2 is then removed and the adjustable side members 17, 17' welded to the basic body of the frame 2 to prevent any further change in their relative position and the weldment cleaned and painted.

The frame 2 having the side (previously adjustable but now fixed) members 17, 17' attached thereto is repositioned within its respective, corresponding basic box 1. After the frame 2 with fixed side members 17, 17' is positioned within the basic casing box 1, fiberglassing surfaces or mats 19 are manually added to cover the facing members 18, 18' of the side members 17, 17' by hand fiberglass techniques to embed the side members 18, 18' into the fiberglass body of the lower box 1. Likewise the bottom, footing 21 and lateral, side 22 members of the frame 2 are covered with hand laid fiberglass mats or layers 20 until they are likewise embedded in the fiberglass box 1. The hand laid fiberglass mats 19, 20 are saturated with resin and allowed to harden. Once hardened, the frame 2 and box 1 are structurally and fixedly integrated together.

The bottom portion 1 of the casing is then basically ready for use with only standard cleaning and finishing procedures remaining.

The top 3 of the casing is formed by standard fiberglassing techniques using an internal, wood frame. The configuration and design of the top is particularly important and has a generally pyramidal-type shape in order to evenly distribute the sealing stresses and pressures put on the top 3 by the retaining nut 11. The stresses and pressures are thus evenly distributed over the interface 4 between the top 3 and the bottom portion 1 of the casing.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. The method of making casing, which includes an outer fiberglass box and an inner metal frame precisely positioned within the box, comprising the following serial steps:
   a. providing a gel coated smooth surfaced mold defining the outer surface of the box;
   b. forming a fiberglass structure on and about the mold with a chopper gun or other non-precise structure forming technique to produce the basic body of the box;
   c. removing the fiberglass box structure from the mold;
   d. providing a metal frame having adjustable side members and placing the frame within the fiberglass box structure;
   e. positioning the frame within the box with respect to its upper lip by means of a positioning jig;
   f. moving the adjustable side members out against the interior sides of the fiberglass box structure;
   g. securing and fixing the heretofore adjustable side members to the frame; and
   h. adding fiberglass layers over the fixed, heretofore adjustable members in the areas which are in contact with the interior sides of the fiberglass box structure and allowing them to harden structurally integrating and attaching the metal frame to the fiberglass box; whereby a box is formed having a precisely positioned frame therein even though non-precise fiberglassing techniques were used to produce the basic fiberglass box structure.

2. The method of claim 1 wherein step "g" includes the following serial steps:
  g.1. removing the frame from the box;
  g.2. welding the side members to the frame in the relative positions determined in step "f"; and
  g.3. repositioning the frame within the box.

3. The method of claim 2 wherein step g further includes the step of cleaning and painting the weldment.

4. The method of claim 1 wherein in step "d" the metal frame provided includes bottom footing structures and in step "h" fiberglass layers are also added over the bottom footing structures.

5. The method of claim 1 wherein in step h the added fiberglass layers are hand-laid.

6. The method of claim 1 wherein in step h the added fiberglass layers are caused to harden by saturating them with resin.

* * * * *